A. G. WATERHOUSE.
Mechanical Movements.
No. 137,115. Patented March 25, 1873.
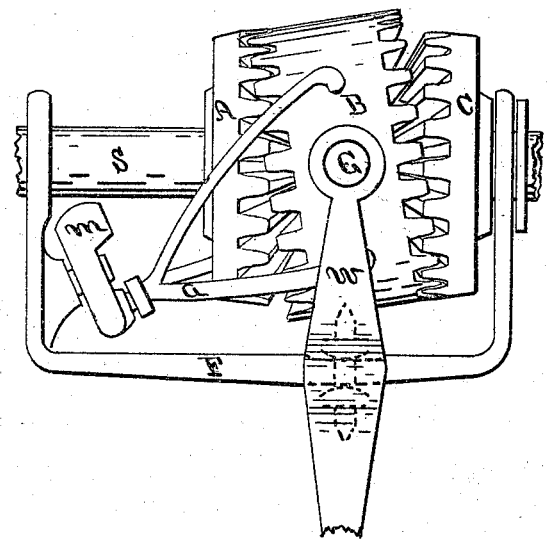

UNITED STATES PATENT OFFICE.

ADDISON G. WATERHOUSE, OF PORTAGE, WISCONSIN, ASSIGNOR TO WATERHOUSE MANUFACTURING COMPANY, OF SAME PLACE.

IMPROVEMENT IN MECHANICAL MOVEMENTS.

Specification forming part of Letters Patent No. 137,115, dated March 25, 1873.

*To all whom it may concern:*

Be it known that I, ADDISON G. WATERHOUSE, of the city of Portage, county of Columbia, State of Wisconsin, have invented a new and Improved Mechanical Motion, of which the following is a specification:

*Nature and Object of the Invention.*

My invention relates to a machine by which a comparatively slow rotary motion is converted into a more rapid motion, either of a rotary or reciprocating form, or by which a comparatively rapid motion may be converted into a slower motion with a proportionate increase of power; and essentially consists of two concentric wheels fixed to one shaft acting or engaging on the opposite sides of a double-faced rolling-wheel, so arranged as to be free to change its plane, so that all points of its toothed or friction surfaces can come in contact with the wheels attached to the shaft.

*Description of the Accompanying Drawing.*

The drawing is an elevation of the machine. Wheels A and C are the twin wheels fixed to and made to rotate with shaft S. Wheel B is placed loosely between wheels A and C, so that it can freely tilt, and any of its cogs can mesh in the cogs of the twin wheels A and C. *a* is an arm running out from several points of wheel B, the end of which has a bearing in the crank-wheel *m*. The rotation of the crank *m* causes all the cogs of A and B and B and C to successively engage; and, as the diameter of B is greater than the equal diameters of A and C, the rotation of the crank *m* causes B to roll around, and at the same time rotate a part of a revolution equal to the difference between the circumference of wheel B and wheels A and C; and as wheel B is prevented from rotating by the oscillating coupling *w* connected to the wheel B and the stationary frame F, therefore the wheels A and C are caused to rotate; and it is also plain that the rotation of the wheels A and C would cause a more rapid rotation of the crank *m*, and at the same time produce a rapid oscillating motion to the coupling *w*.

What I claim as my invention, and desire to secure by Letters Patent, is—

1. The combination of the three wheels A, B, and C, substantially as and for the purposes hereinbefore set forth.

2. The combination of the oscillating coupling *w* with the wheels A, B, and C, substantially as and for the purposes hereinbefore set forth.

3. The combination of the swinging arm *a* and the crank *m* with the wheels A, B, and C, substantially as and for the purposes hereinbefore set forth.

ADDISON G. WATERHOUSE.

Witnesses:
    D. A. GOODYEAR,
    FRANK SCHULZE.